March 1, 1966

C. F. LEYSE ETAL 3,238,107

FLUX-TRAP RESEARCH AND TESTING NUCLEAR REACTOR

Filed April 3, 1963

Carl F. Leyse
Oscar J. Elgert
Byron H. Leonard, Jr. INVENTORS

BY

March 1, 1966

C. F. LEYSE ETAL 3,238,107

FLUX-TRAP RESEARCH AND TESTING NUCLEAR REACTOR

Filed April 3, 1963

Carl F. Leyse
Oscar J. Elgert
Byron H. Leonard, Jr. INVENTORS.

BY

Carl F. Leyse
Oscar J. Elgert
Byron H. Leonard, Jr. INVENTORS.

Carl F. Leyse
Oscar J. Elgert
Byron H. Leonard, Jr.
INVENTORS

March 1, 1966  C. F. LEYSE ETAL  3,238,107
FLUX-TRAP RESEARCH AND TESTING NUCLEAR REACTOR
Filed April 3, 1963  15 Sheets-Sheet 5

Carl F. Leyse
Oscar J. Elgert
Byron H. Leonard, Jr.
INVENTORS.

BY

Carl F. Leyse
Oscar J. Elgert
Byron H. Leonard, Jr.
INVENTORS.

March 1, 1966 C. F. LEYSE ETAL 3,238,107
FLUX-TRAP RESEARCH AND TESTING NUCLEAR REACTOR
Filed April 3, 1963 15 Sheets-Sheet 7
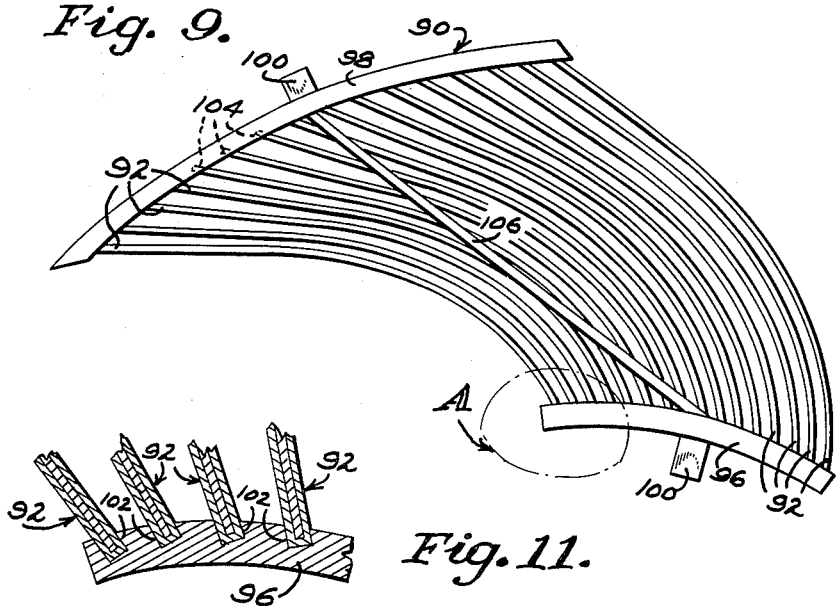
Fig. 9.
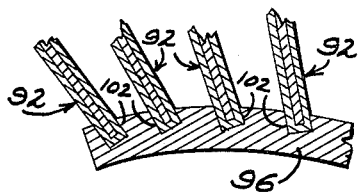
Fig. 11.
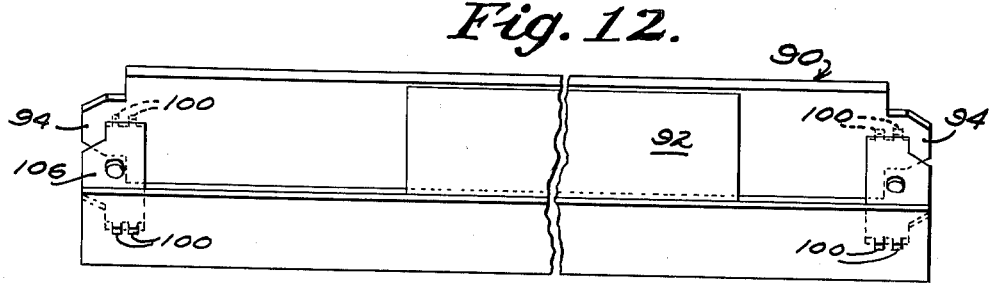
Fig. 12.
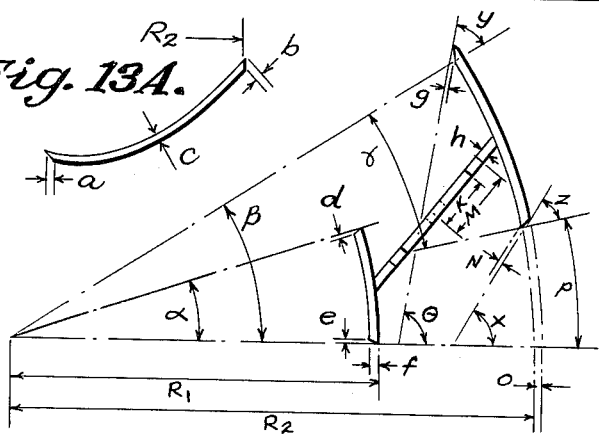
Fig. 13A.
Fig. 13.
Carl F. Leyse
Oscar J. Elgert
Byron H. Leonard, Jr.
INVENTORS.
BY

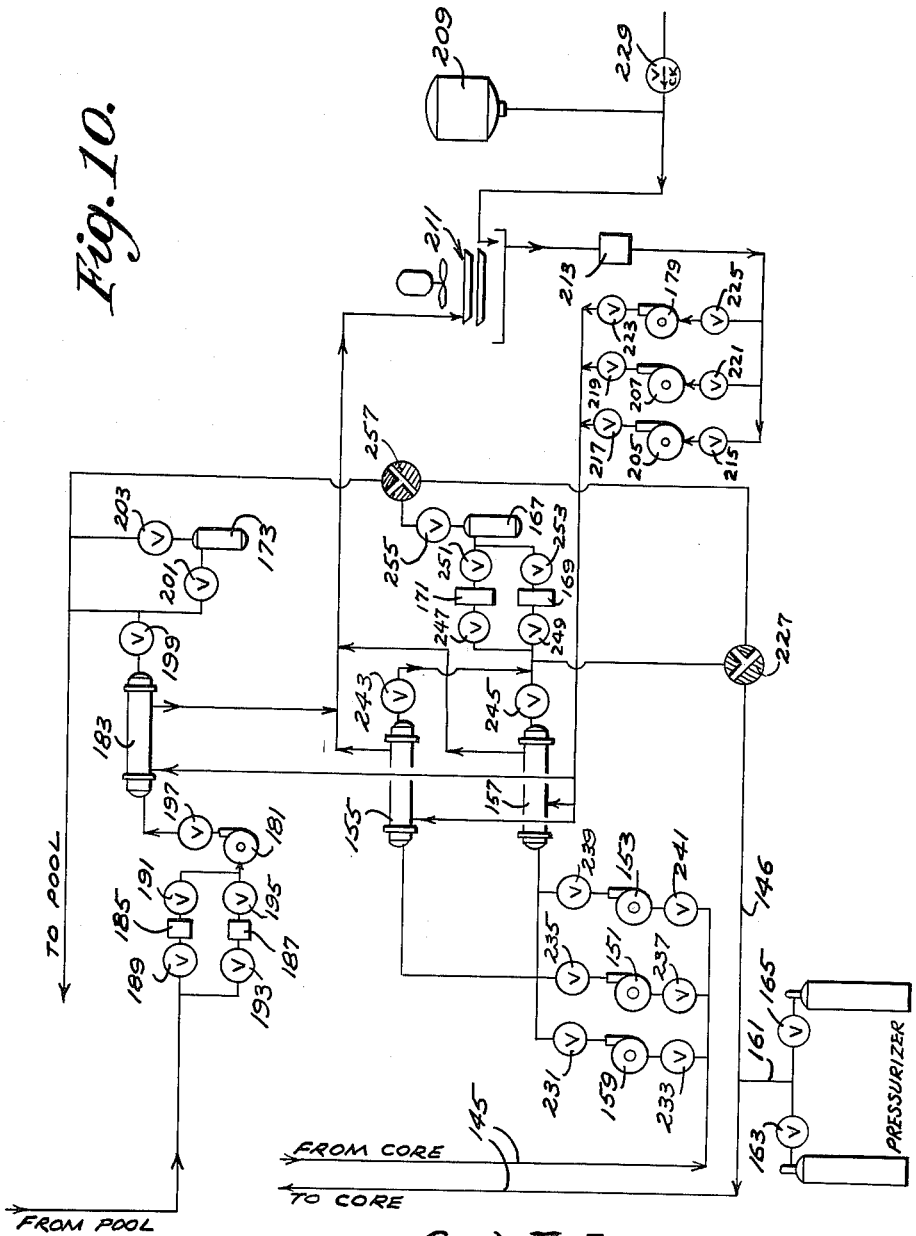

Carl F. Leyse
Oscar J. Elgert
Byron H. Leonard, Jr. INVENTORS.

March 1, 1966

C. F. LEYSE ETAL 3,238,107

FLUX-TRAP RESEARCH AND TESTING NUCLEAR REACTOR

Filed April 3, 1963

Carl F. Leyse
Oscar J. Elgert
Byron H. Leonard, Jr. INVENTORS.

BY

Carl F. Leyse
Oscar J. Elgert
Byron H. Leonard, Jr.
INVENTORS.

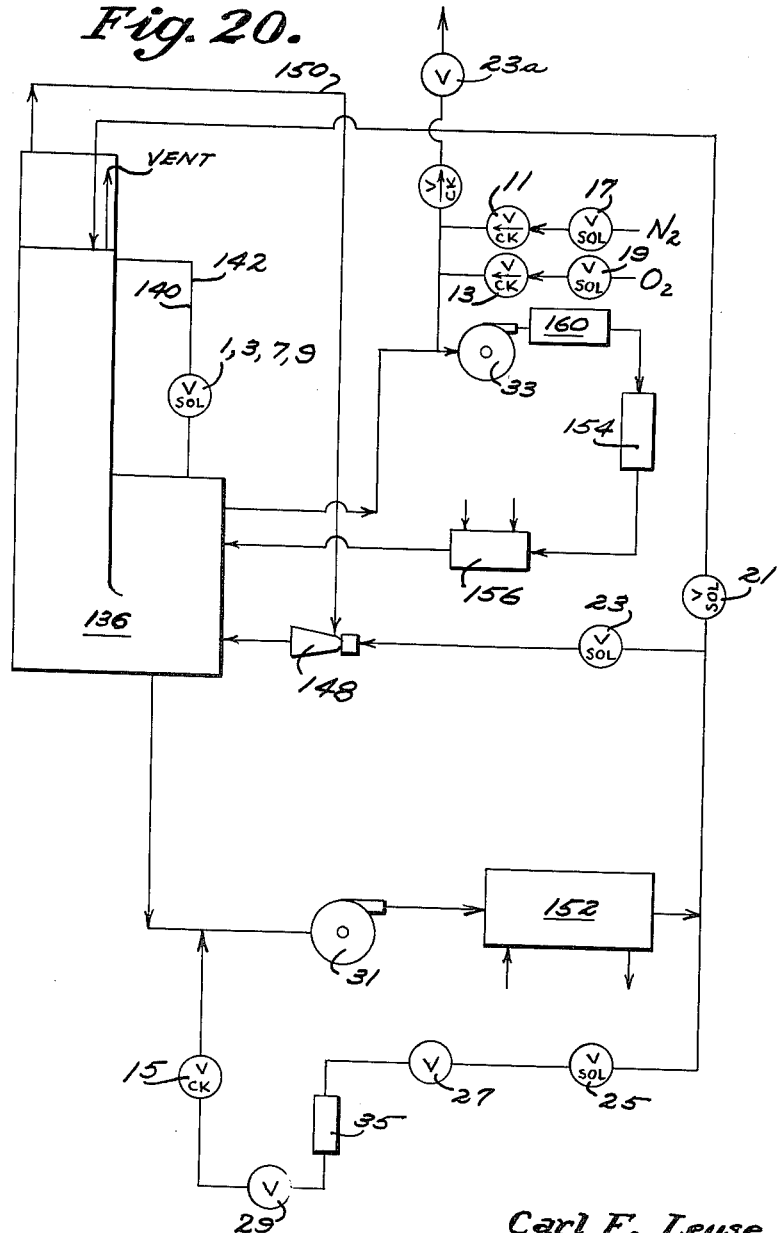

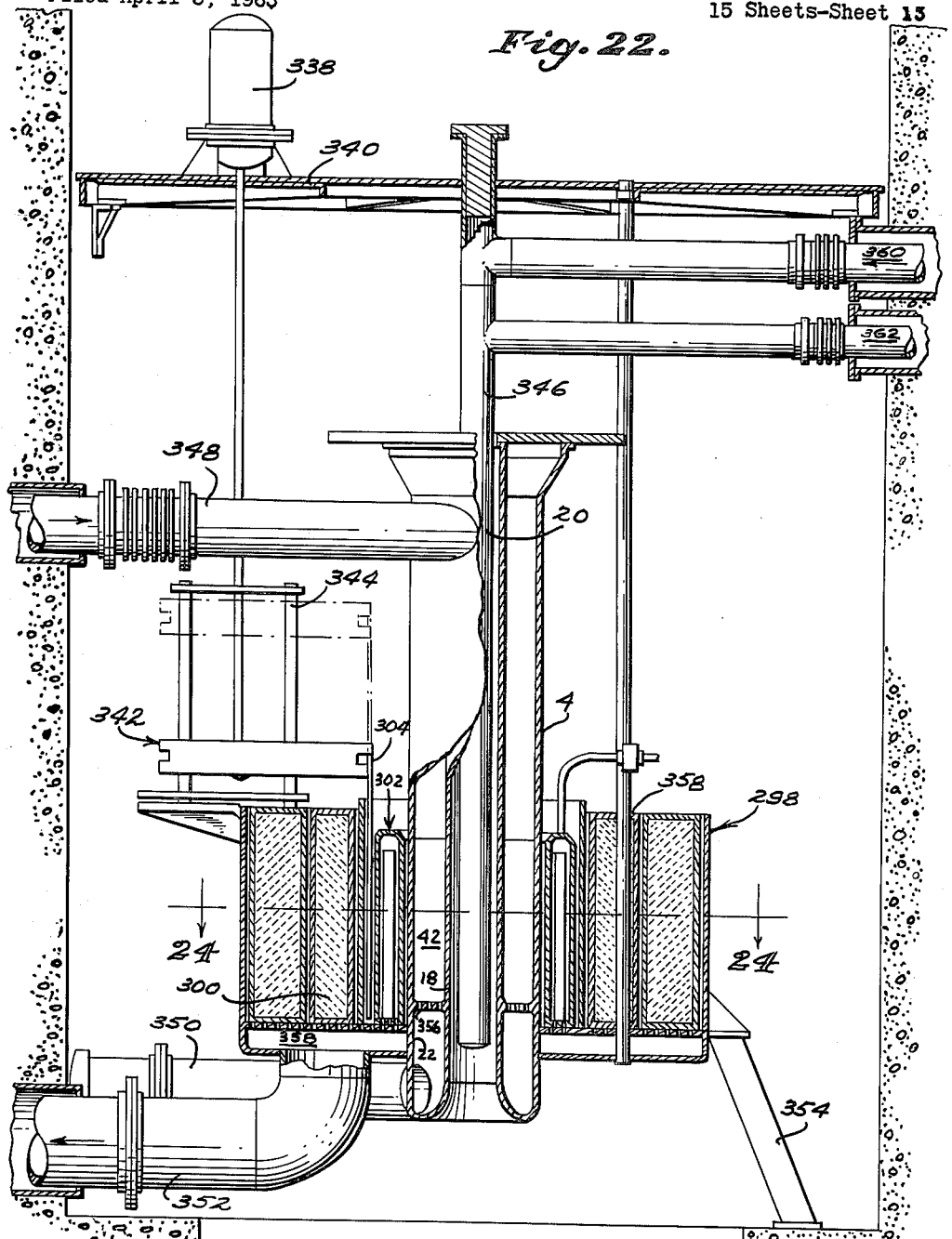

March 1, 1966     C. F. LEYSE ETAL     3,238,107
FLUX-TRAP RESEARCH AND TESTING NUCLEAR REACTOR
Filed April 3, 1963     15 Sheets-Sheet 14

Carl F. Leyse
Oscar J. Elgert
Byron H. Leonard, Jr.
INVENTORS.

BY

March 1, 1966  C. F. LEYSE ETAL  3,238,107
FLUX-TRAP RESEARCH AND TESTING NUCLEAR REACTOR
Filed April 3, 1963  15 Sheets-Sheet 15

Carl F. Leyse
Oscar J. Elgert
Byron H. Leonard, Jr.
INVENTORS

BY

United States Patent Office 3,238,107
Patented Mar. 1, 1966

3,238,107
FLUX-TRAP RESEARCH AND TESTING
NUCLEAR REACTOR
Carl F. Leyse, Chesterfield, Mo., Oscar J. Elgert, Sunnyvale, Calif., and Byron H. Leonard, Jr., St. Louis, Mo., assignors to Internuclear Company, a corporation of Missouri
Filed Apr. 3, 1963, Ser. No. 270,272
13 Claims. (Cl. 176—62)

This invention relates to research and testing nuclear, or neutronic, reactors and more particularly to flux-trap nuclear reactors primarily for use in research and development.

Nuclear reactors and their construction and operation are well known and specific details of the theory and essential characteristics of nuclear reactors are set forth in prior art publications including, among others, (1) U.S. Patent No. 2,708,656, issued on May 17, 1955, to E. Fermi and L. Szilard, (2) Experimental Production of Divergent Chain Reaction, E. Fermi, American Journal of Physics, vol. 20, No. 9, December 1952, (3) Science and Engineering of Nuclear Power, C. Goodman, Addison-Wesley Press, Inc., Cambridge, Mass., vol. 1 (1947) and vol. 2 (1949), (4) The Elements of Nuclear Reactor Theory, S. Glasstone and M. Edlund, D. Van Nostrand Co., Inc., New York, 1952, (5) Elementary Pile Theory, H. Soodak and E. C. Campbell, John Wiley and Sons, New York 1950, (6) Current Status of Nuclear Reactor Theory, A. Weinberg, Am. J. of Phys., vol. 20, October 1952, pp. 401–412, (7) Multigroup Methods for Neutron Diffusion Problems, R. Ehrlich and H. Hurwitz, Jr., Nucleonics, vol. 12, No. 2, February 1954, pp. 23–30, (8) Neutron Cross Ssections, A.E.C.U.–2040, OTS, Dept. of Commerce, and (9) the engineering test reactor utilizing the flux-trap principle disclosed in U.S. Patent No. 2,857,324, issued on Oct. 21, 1958.

In research and testing nuclear reactions it is highly desirable to obtain maximum neutron utilization coupled with maximum accessibility for experimentation in regions of high neutron flux, and the most effective method for achieving this is to employ the flux-trap principle in a nuclear reactor which is characterized by thin fuel regions adjacent to a good moderator which slows down the neutrons and causes the thermal neutron flux to peak in a region accessible for experimentation. The simplest geometry and the most effective for loop testing is an annular core surrounding a light water island, said light water island being open to the pool and capable of accommodating for insertion therein a thimble or U-tube loop. Typical unperturbed thermal neutron fluxes in thimble or U-tube loop inserted in the light water island may be four to six times that available in the reflector of a typical solid core research nuclear reactor operated at the same power level. Said island constitutes the center flux-trap, which is open to the pool. In a nuclear reactor utilizing the flux-trap principle the advantage of high leakage applies also to neutron utilization outside of the reactor core, for example, in the reflector, so that high neutron fluxes are provided in experimental positions in the reflector.

Although open pool flux-trap reactors can be constructed in the lower power range such as up to 5 mw., the open pool type is limited in higher power level by several effects such as (1) heat exchange requirements and (2) pool activity. Since the core water must enter at pool temperature, the mean temperature difference is small while surface requirements are large. Since the aluminum clad fuel leads to sodium activity [$Al^{27}(n,a)Na^{24}$], this activity is generally removed by an ion exchange demineralizer, and the production of $Na^{24}$ increases as the power level of the reactor increases. For example, at 10 mw., demineralizer flow of 400 g.p.m. is required to obtain tolerance at the surface of a pool of normal size, and demineralizing such large amounts of water requires large and expensive demineralizer systems.

The effectiveness of a research nuclear reactor utilizing the flux-trap principle can be enhanced by pressurizing the core. However, when pressurized core vessels are employed, various problems are impose on the systems, particularly as applied to operating the reactor without complicated sealing systems.

It is highly desirable to provide a relatively inexpensive research nuclear reactor with a pressurized core where the problems associated therewith are minimized and the operations of the reactor and test loop are carried out without disturbing the pressurized core. It is also desirable to provide a nuclear reactor having simplified and efficient reflector control and experimental facilities.

A unique feature of this invention is a relatively thin annulus of a suitable shim material, such as borated $H_2O$, located between the reactor core and the reflector. The radius ratio of the borated shim region to the radius of the total reflector region is, for example, about 1/10 to 1/75, such as about 1/15 to 1/40, but preferably about 1/20 to 1/30. Where $D_2O$ is employed in a droppable safety system, the radius ratio of the shim region to the $D_2O$ region is from about 1/5 to 1/40, such as about 1/10 to 1/20, but preferably about 1/12 to 1/16. The use of the liquid shim provides the following advantages:

(1) The size of the system is reduced;
(2) Borated $H_2O$ can be used in place of borated $D_2O$ system; a thin region of borated $H_2O$ is about as effective as a thicker region of borated $D_2O$ and has the great advantage of not requiring a deuterated resin bed to adjust boron concentration;
(3) It is compatible with both the more conventional solid reflector and shim-safety rods as well as a droppable $D_2O$ safety system;
(4) The extent to which shim controls perturb the neutron fluxes in the reflector test holes is minimized; and
(5) A simple on-off control, similar to that required by control blade, of boric acid concentration by injecting pure demineralized water or a saturated boric acid solution, is adequate for shim control.

Another unique feature of this invention is the particular construction of the reactor with respect to the fact that all test holes are open to the pool thereby to facilitate the insertion of experimental facilities therein without the problem of pressure sealing and to make it possible for experimental test loops to be easily inserted therein and to operate independently of other systems of the reactor. The split top head of the core permits refueling without removal of the control test loop.

Contemplated to be within the scope of this invention are several embodiments of our flux-trap research and testing nuclear reactor, each embodiment of the nuclear reactor comprising basically a vertical cylinder flux-trap reactor with a light water central island constituting a test hole, or well, open to the pool, a light water cooled aluminum plate type core contained in a slightly pressurized annular vessel, a thin borated light water shim control region just outside said vessel, followed by the reflector assembly. In one embodiment there is provided, as part of the reflector assembly, an inner reflector region of $D_2O$, which is dropped to provide safety control. In another embodiment there is provided, as part of the reflector assembly, instead of the inner reflector region of $D_2O$, an inner reflector region of beryllium and conventional safety rods in combination with a thin borated light water shim control region just outside said vessel, followed by the aforedescribed reflector assembly. In all embodiments an outer graphite reflector is provided. The nuclear reactor of each embodiment is capable of operating at 20 mw. power level with the addition only of cooling tower capacity and at 30 mw. power level with non-uniformly loaded fuel and additional cooling tower capacity.

An object of this invention is to provide a simplified research nuclear reactor utilizing the flux-trap principle comprising a pressurized vessel having positioned therein a core containing materials fissionable by neutrons, primarily of thermal energy, or atomic fuel, or nuclear fuel, where the operations thereof can be carried out without disturbing the pressurized core; and the reactor has simplified and efficient reflector control and experimental facilities.

Another object of this invention is to provide a relatively inexpensive research nuclear reactor incorporating the flux-trap principle for obtaining relatively high thermal neutron fluxes in the center test hole as well as in the reflector test holes.

Another object of this invention is to provide a research flux-trap nuclear reactor including a pressurized core vessel surrounding a non-pressurized island constituting a test hole.

Another object of this invention is to provide a reflector having a plurality of test holes which are open directly to the pool.

Another object of this invention is to provide a split top cover for the core vessel which permits pressurizing the core for high power operation but which can be removed for refueling the reactor without disturbing the test loops inserted in the central test hole.

Another object of this invention is to provide a liquid shim region of borated $H_2O$ or of borated $D_2O$ in a relatively thin annulus located between the reactor core and the reflector.

Another object of this invention is to provide a heavy water reflector which can be dropped for safety control, preferably having scram valves above the core for ease of maintenance in a relatively low irradiation field but still being sufficiently close to minimize gas flow resistance so as to enhance scram speed.

Another object of this invention is to provide experimental test loops or test assemblies which can be inserted in the non-pressurized core island constituting a test hole therein and in the non-pressurized test holes in the reflector thus facilitating operational handling, maintenance and safety; since these test loops do not require penetration of the pool wall below the reflector, they can be easily replaced.

Another object of this invention is to provide a liquid shim of borated $H_2O$ or of borated $D_2O$ in a relatively thin annulus located between the reactor core and the reflector, said reflector comprising either (1) a droppable $D_2O$ region whose size is sufficient for safety control, employed in combination with graphite in the outer reflector so as to reduce cost, or (2) other suitable reflectors in place of $D_2O$, for example beryllium, in conjunction with graphite, employing conventional control rods.

Other objects and features of this invention will become apparent from the following detailed description which is illustrative and non-limiting.

Like numerals designate like components.

FIGURE 1 is a graphical representation of the average radial flux distribution within the reactors of this invention showing thermal neutron flux and fast neutron flux plotted against radius, or radial distance, in centimeters from the center line of the center test hole, said center line being zero, sodium having been chosen only to represent a typical absorbing material, each of said reactors having a clean shim region.

FIGURE 9 is a top plan view of a fuel element in one embodiment of the annular core.

FIGURE 10 is a flow diagram of the coolant system.

FIGURE 11 is an enlarged detail of the section within A of FIGURE 9.

FIGURE 12 is a side elevational view of the fuel element in FIGURE 9.

FIGURE 13 is a top elevational view of the fuel element in FIGURE 9.

FIGURE 13a is a top elevational view of end fuel plate of the fuel element in FIGURE 9.

FIGURE 20 is a schematic of the droppable liquid $D_2O$ reflector flow diagram.

FIGURE 22 is a view in elevation, partially in section and partially in block schematic, of another embodiment of the nuclear reactors of this invention, taken along line 22—22 in FIGURE 23.

Figure 2:
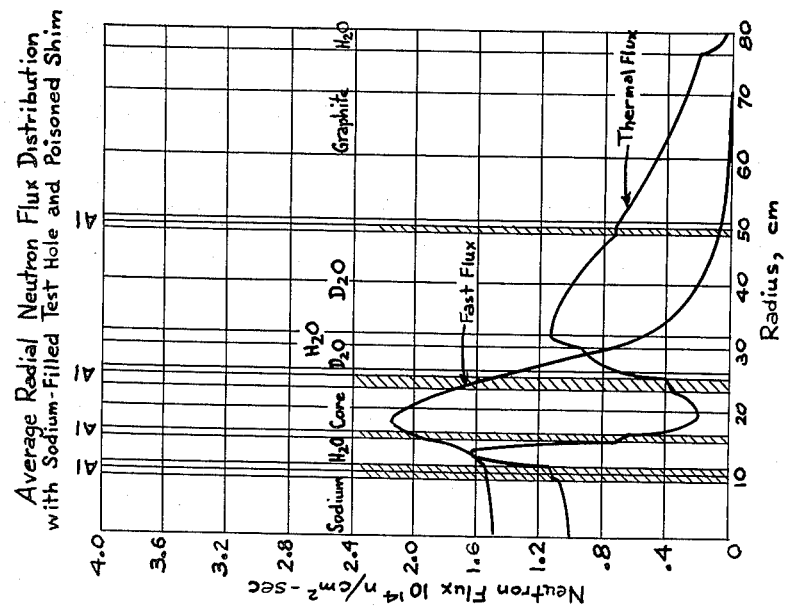
FIGURE 2 is a graphical representation such as is that of FIGURE 1 and differs from FIGURE 1 in that the values were obtained with a poison shim region.
Figure 1:
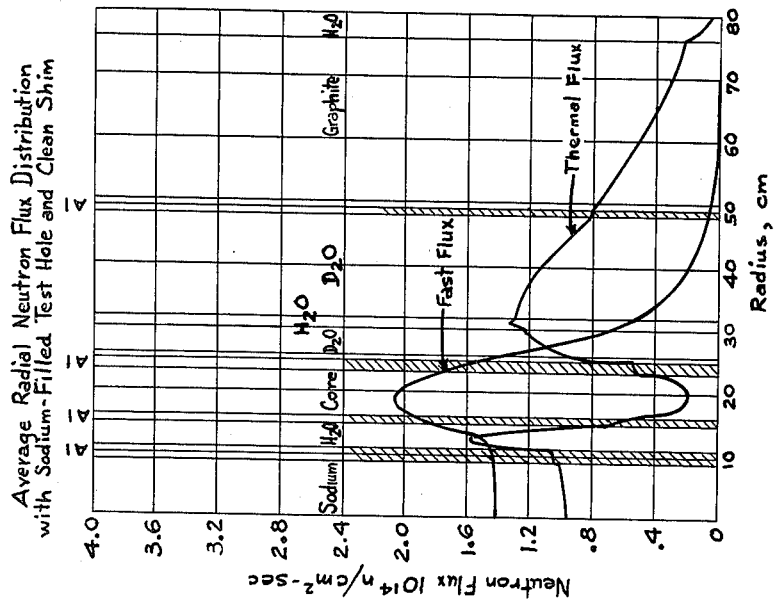
Figure 4:
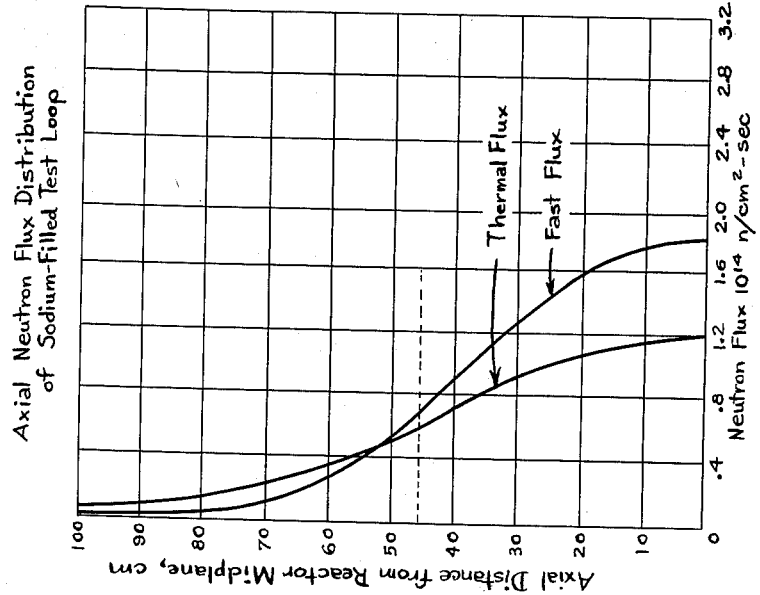
FIGURE 4 is a graphical representation of the axial thermal neutron flux and fast neutron flux distributions of a sodium-filled test loop in a test hole through the reflector of each of the reactors of this invention.
Figure 3:
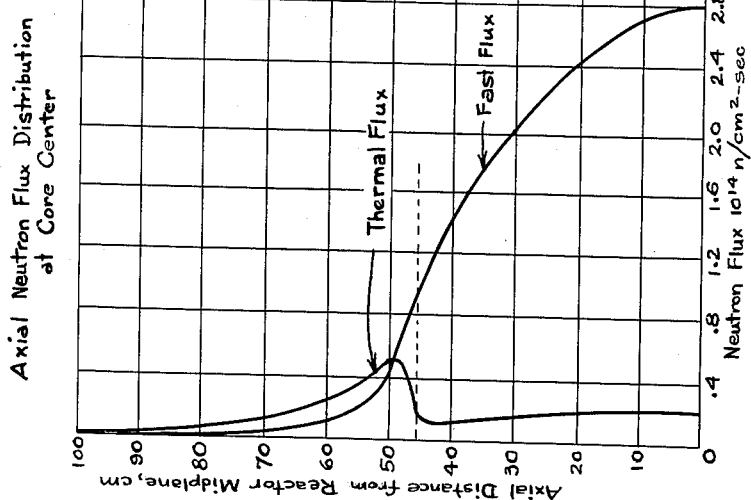
FIGURE 3 is a graphical representation of the axial thermal neutron flux and fast neutron flux distributions at the center of the core of the reactors of this invention.
Figure 5:
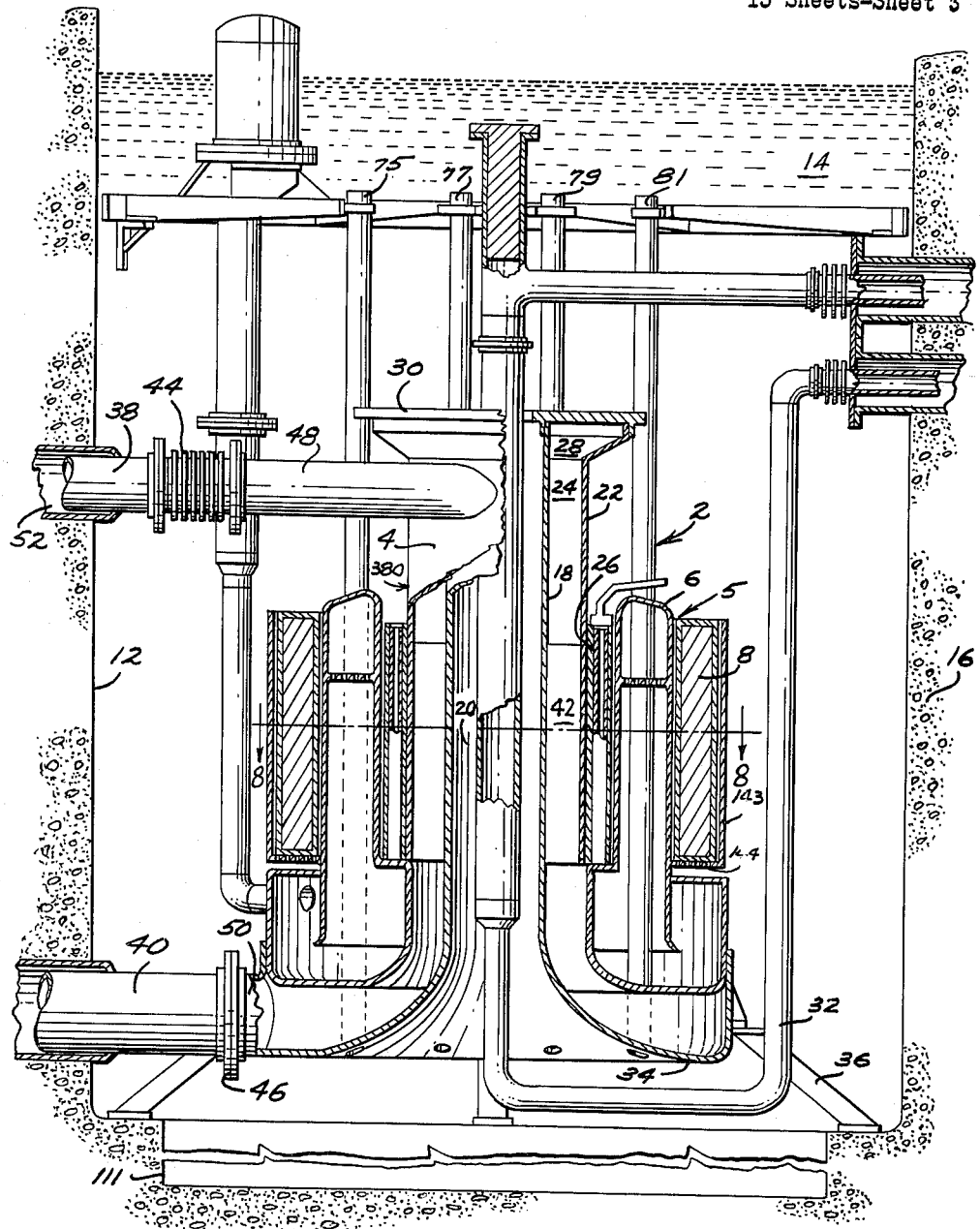
FIGURE 5 is a view in elevation, partially in section and partially in block schematic, of one embodiment of the nuclear reactors of this invention, taken along line 5—5 in FIGURE 6.
Figure 6:
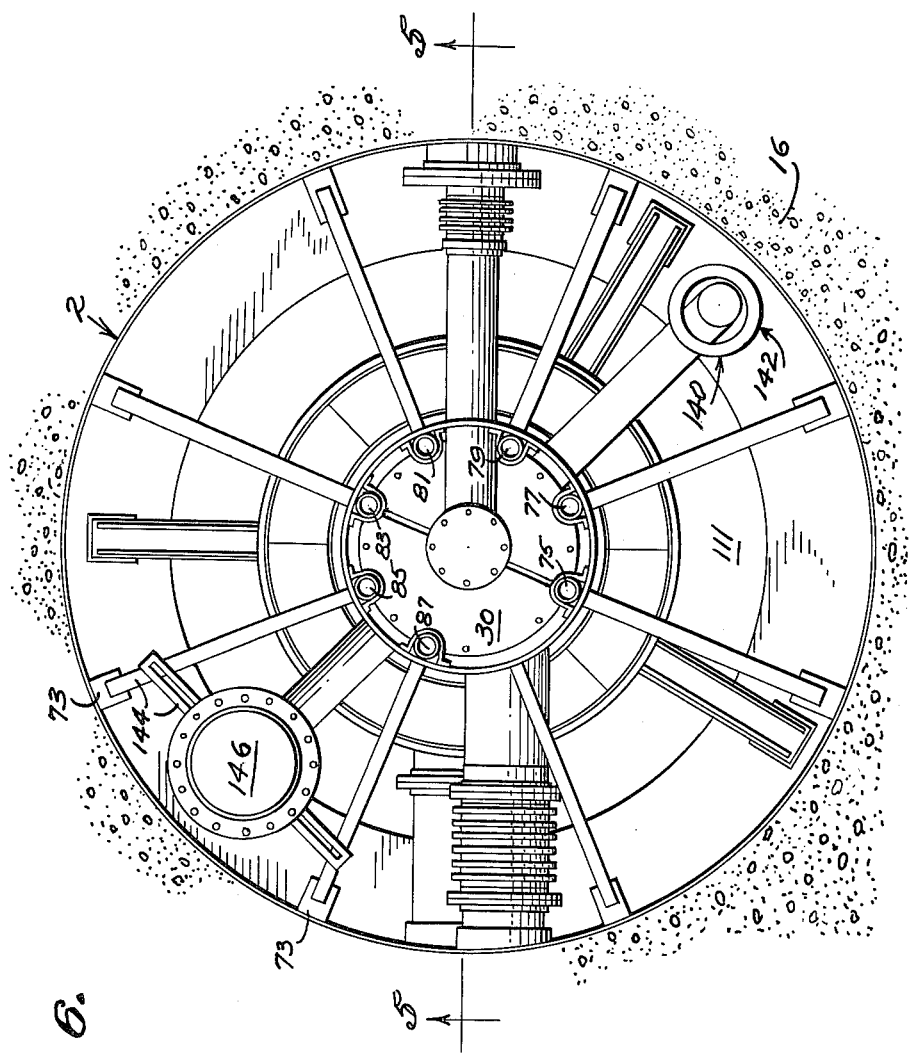
FIGURE 6 is a top plan view of the reactor of FIGURE 5 showing particular layout features.
Figure 7:
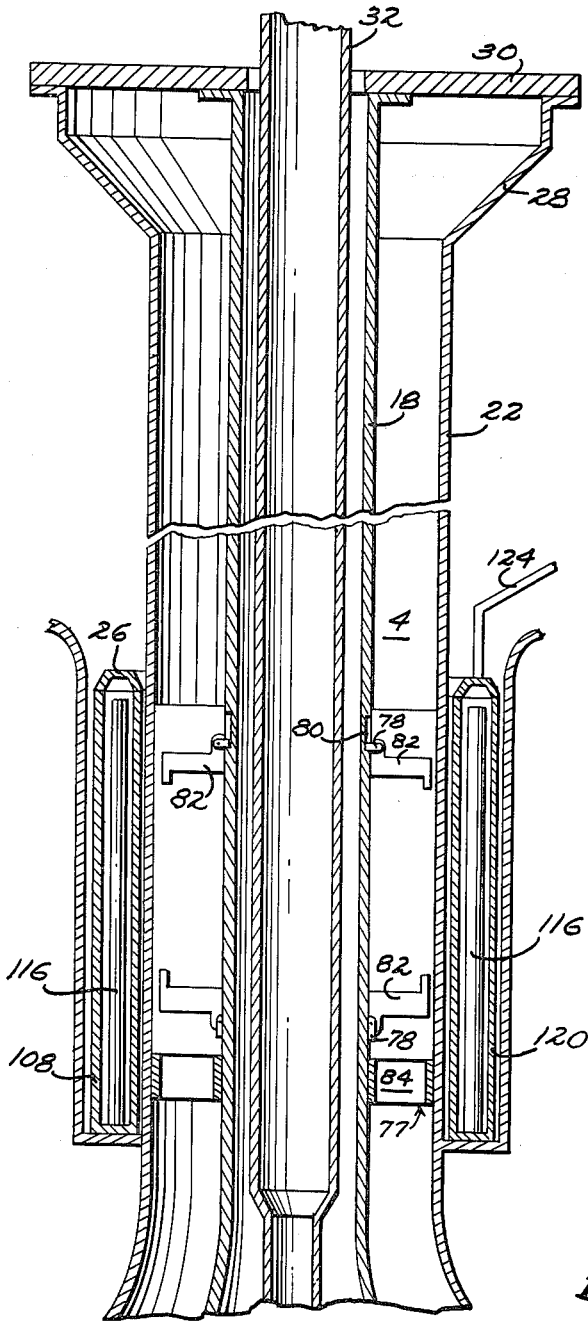
FIGURE 7 is a vertical sectional view taken on line 7—7 of FIGURE 8 showing one embodiment of annular core.
Figure 21:
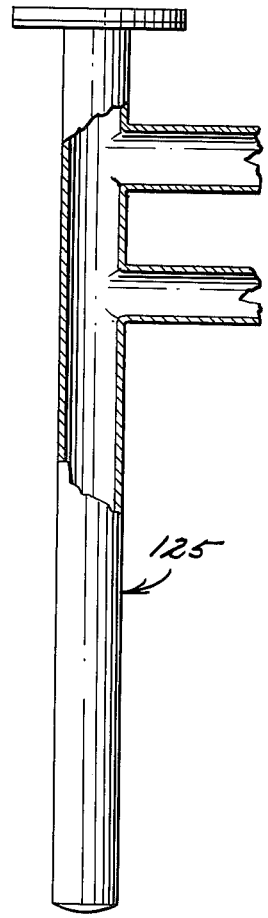
FIGURE 21 is a front elevational view partly in section of a thimble test loop.
Figure 8:
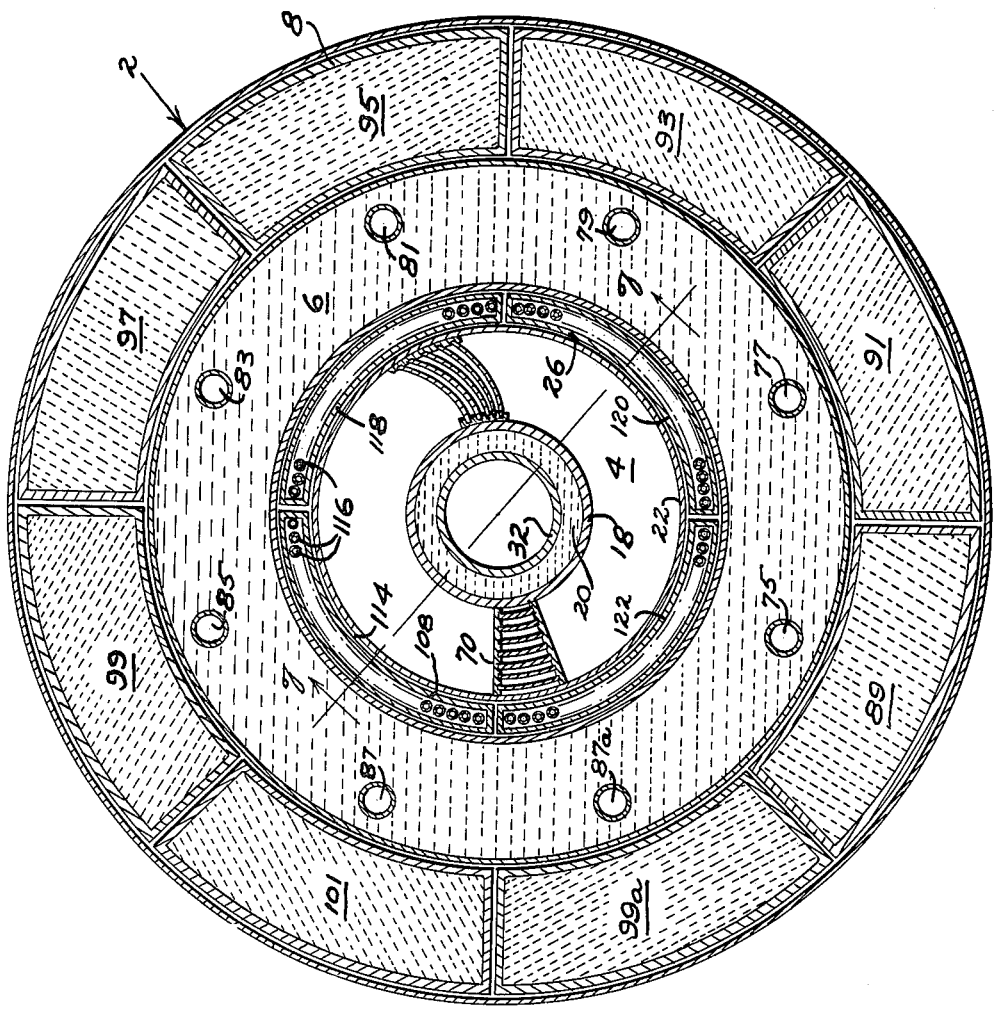
FIGURE 8 is a sectional view taken on line 8—8 of FIGURE 5 showing each embodiment of the fuel elements.
Figure 14:
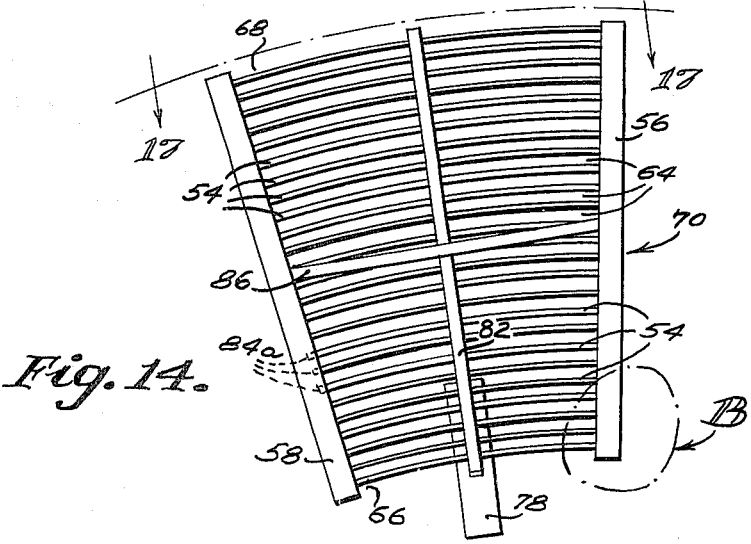
FIGURE 14 is a top plan view of a fuel element in another embodiment of the annular core.
Figure 15:
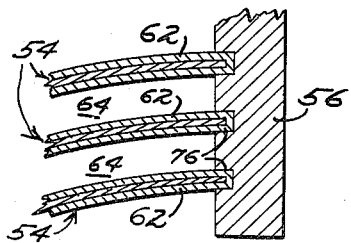
FIGURE 15 is an enlarged detail of the section within B of FIGURE 14.
Figure 17:
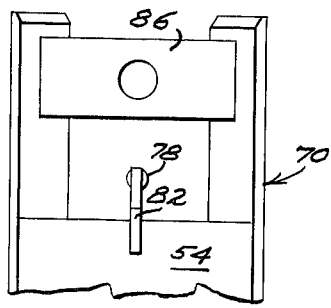
FIGURE 17 is a view in the direction of line 17—17 in FIGURE 14.
Figure 16:
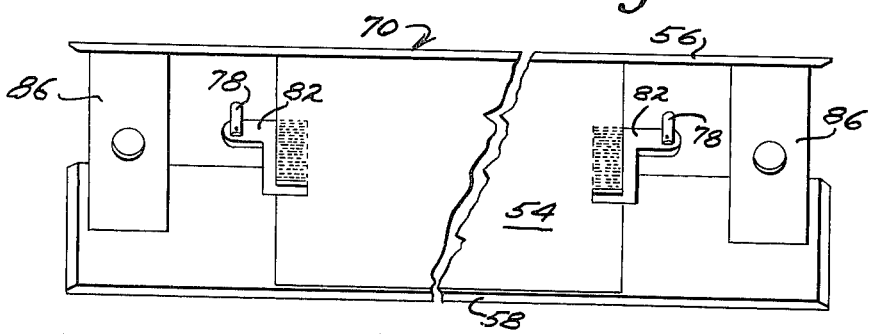
FIGURE 16 is a slide elevational view of the fuel element in FIGURE 14.
Figure 18:
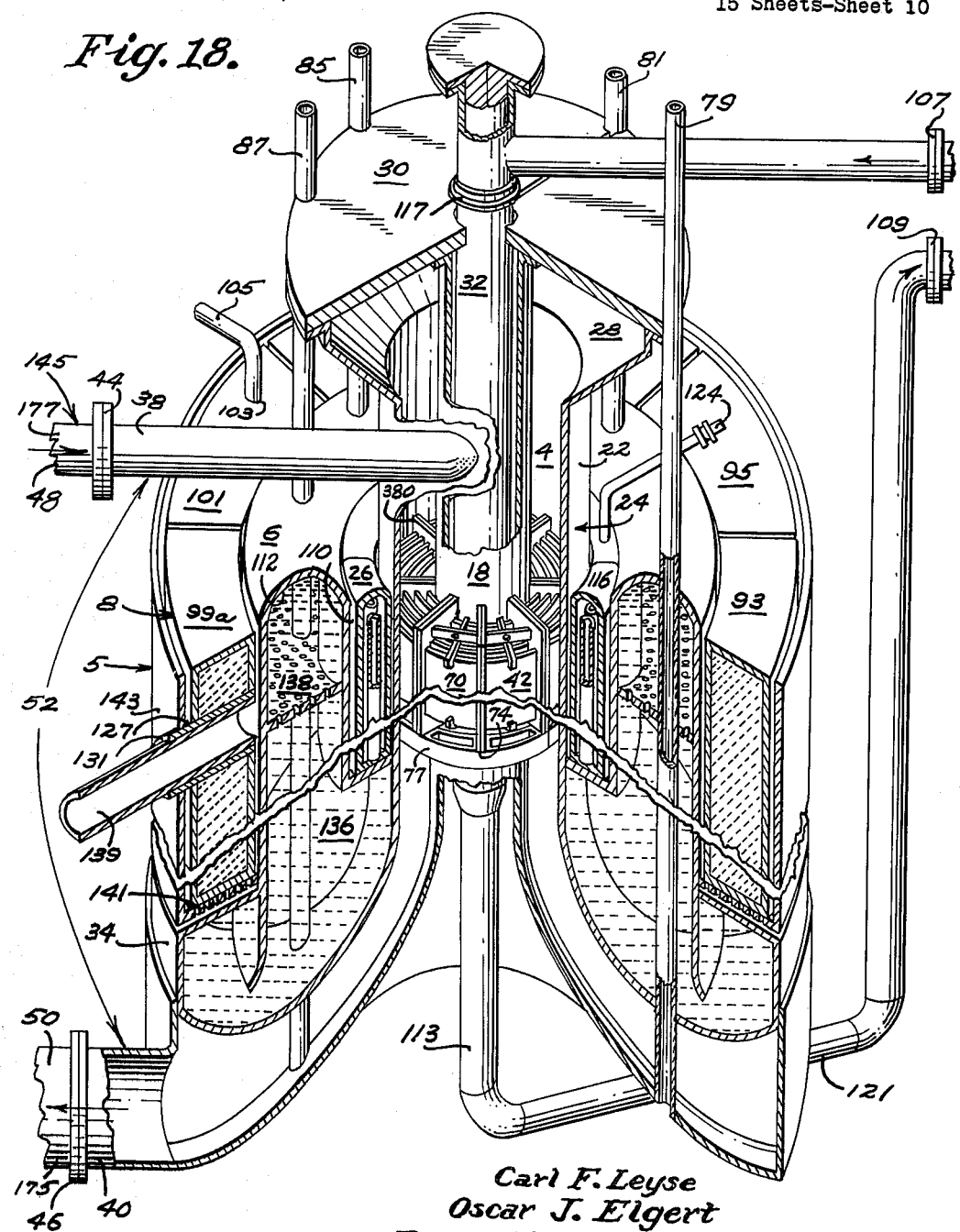
FIGURE 18 is a partial sectional view in perspective including the pressurized reactor core vessel, the control region, and the reflector assembly.
Figure 19:
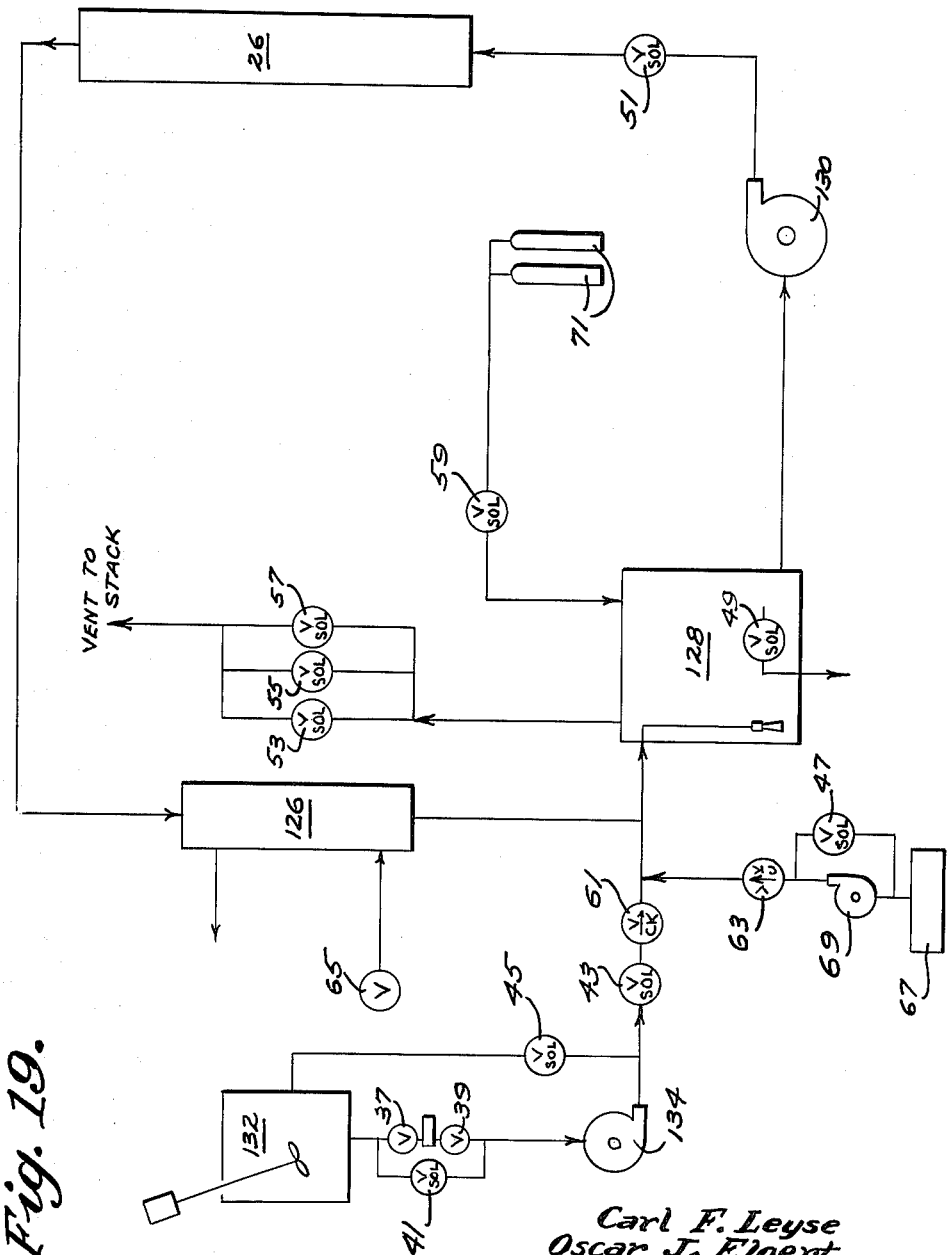
FIGURE 19 is schematic of the liquid shim control region flow diagram.
Figure 23:
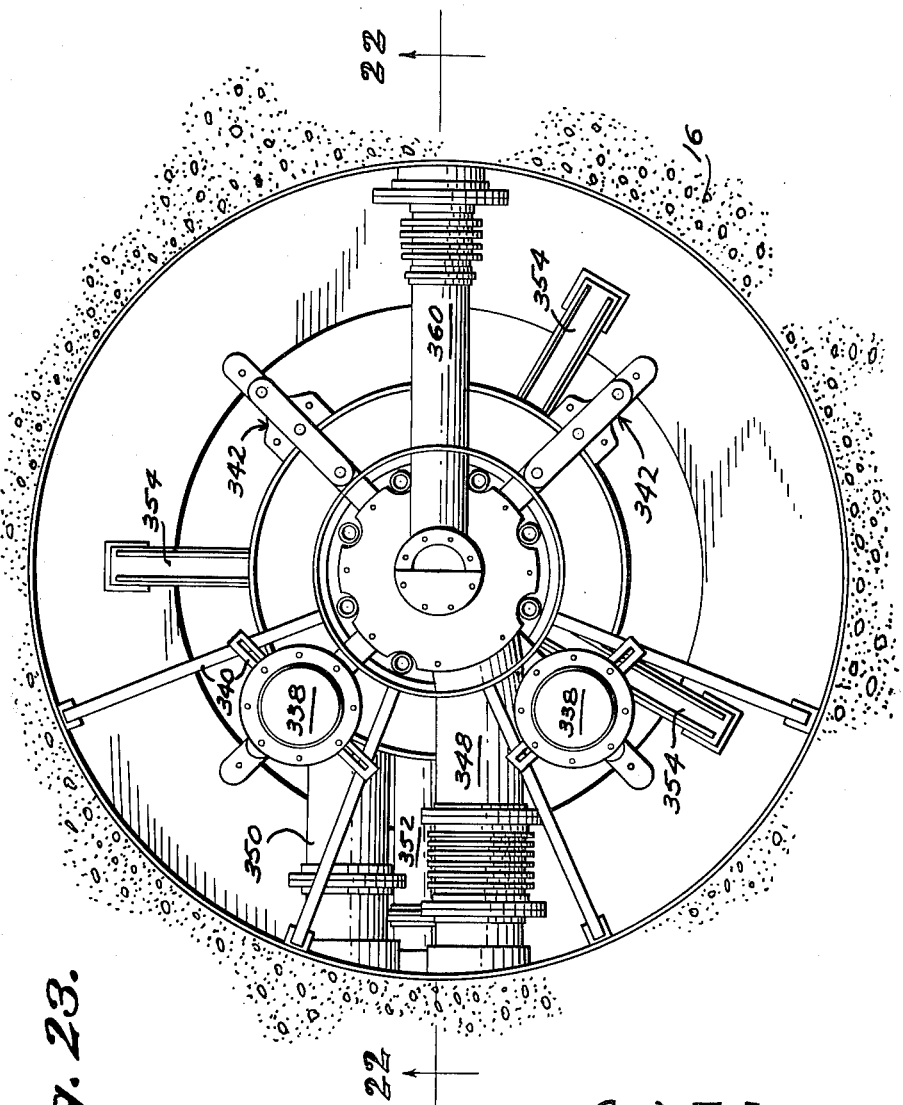
FIGURE 23 is a top plan view of the reactor of FIGURE 22 showing particular layout features.
Figure 24:
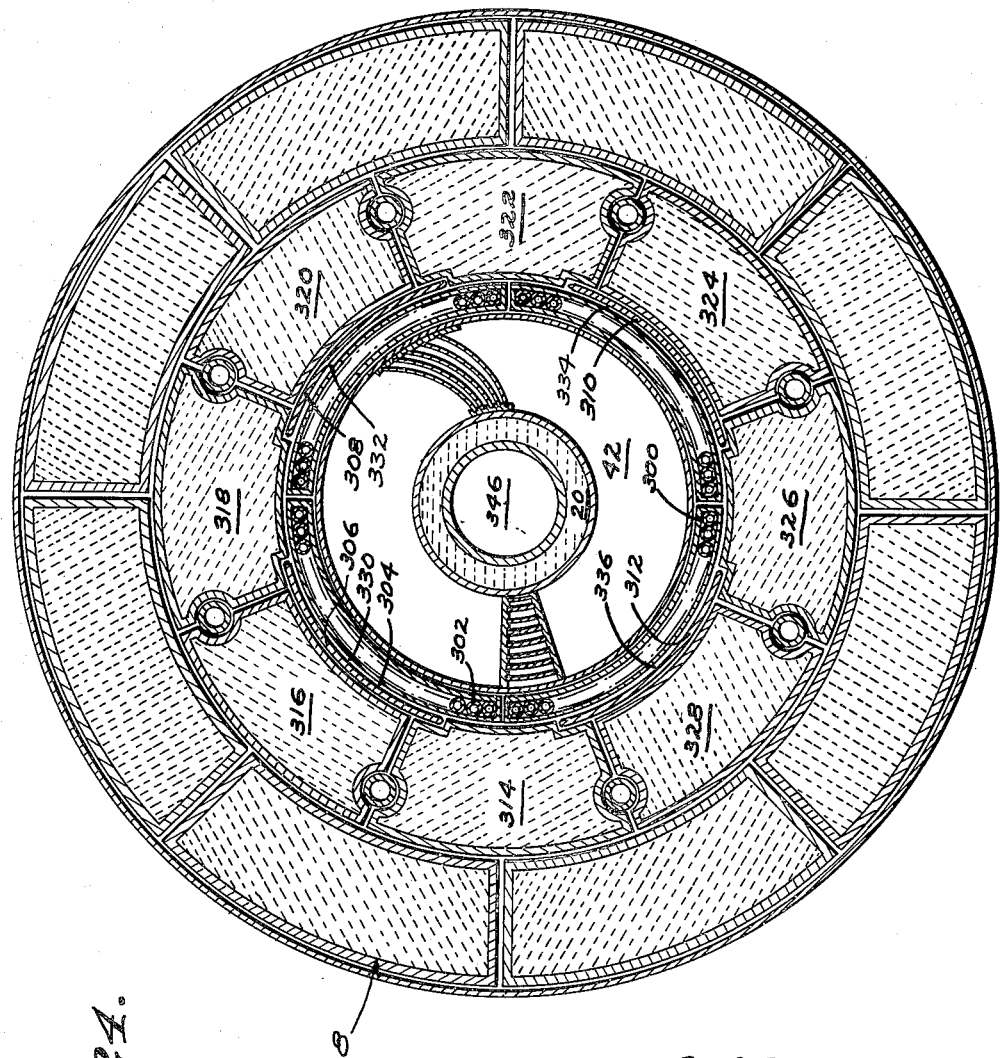
FIGURE 24 is a sectional view taken on line 24—24 of FIGURE 22 showing each embodiment of the fuel elements in the embodiment of the reactor of FIGURE 22.

More specifically, nuclear reactor 2, including annular pressurized vessel 4, reflector assembly 5 including droppable fluid, preferably liquid $D_2O$, reflector portion 6 and graphite portion 8, is positioned in main pool vessel 12, and said reactor 2 is covered, during operation thereof, by demineralized light water 14. Surrounding reactor 2 is a barytes concrete shield 16, and pool water 14 and shield 16 constitute the radial reactor shield, the density of said concrete shield 16 being 3.4 grams/cubic centimeter. Said pool water 14 constituting the reactor pool in said main pool vessel 12 is 33 feet deep. Said annular pressurized vessel 4 is of aluminum, approximately 11⅞ inches inside diameter and approximately 19¼ inches outside diameter at the annular reactor core section, said reactor core 42 being positioned within said annular pressurized vessel 4, said annular core 42 containing the atomic fuel, or material fissionable by thermal energy, hereinafter more fully decribed. The inner vessel wall 18 of said annular pressurized vessel 4 extends straight upward above said core 42 approximately 6 feet to provide maximum experimental space in the centrally positioned light water island 20 constituting the central test well, or hole, hereinafter more fully described. The outer vessel wall 22 of said annular pressurized vessel 4 extends upward approximately 5 feet above said core 42 in a straight section and then flares out to a diameter of approximately 26 inches for the remaining distance. Said five-foot straight section 24 permits the removal and the replacement of the liquid shim control region 26, hereinafter more fully described, and the so-formed larger diameter section 28 facilitates refueling. Split top head 30 is provided to seal positively said annular pressurized vessel 4 while providing an opening permitting light water island 20 to open into said pool water 14 and to permit its complete removal from around central test loop 32 inserted in island 20 so as not to interfere with refueling. Below core 42 vessel walls 18 and 22 extend straight downwardly for approximately two feet and then flare outwardly and extend horizontally to form an outlet coolant plenum and a support 34 for the reflector assembly 5. Reactor assembly 2 is supported by support legs 36 below the reflector plenum. Inlet coolant water enters approximately 4½ feet above core 42 through reactor coolant inlet nozzle 38. The long, straight section 380 of reactor vessel 4 above core 42 establishes uniform radial flow distribution to the top of core 42. Aluminum outlet coolant nozzle 40, approximately 14 inches in diameter, extends horizontally from the bottom plenum. Each of nozzles 38 and 40 are flanged, as at 44 and 46, respectively, and connected to stainless steel primary coolant pipes 48 and 50, respectively, within pool vessel 12 in pool water 14. Of particular note is the fact that maximum use of stainless steel equipment in the primary coolant loop 52 including nozzles 38, 40, 48 and 50 minimizes corrosion and thereby reduces the demineralizer flow requirement.

Each fuel element of annular core 42 may be one of two embodiments.

The embodiment of the fuel element 70 has twenty-five curved fuel plates 54 each of varying circumferential length spanning the distance between radial side plates 56 and 58 of each element. Each fuel plate 54 consists preferably of a 20 mil section 60 of U-Al alloy (29% U in Al, uranium being 90% enriched) clad on both sides with 15 mils of aluminum 62. Each water gap 64 between two adjacent fuel plates 54 is 75 mils thick and 50 mil water gaps 66, 68 are left beyond inner and outer fuel plates 54, 54. The active fuel length of each plate 54 is thirty-six inches. Fuel element 70 consists of twenty-five of said curved fuel plates 54, and eighteen of said fuel elements 70 form annular core 42. Each of fuel elements 70 is supported by spider 77 having radial ribs 84 spanning annular core 42 and grooved to form channels 74 for side plates 56 and 58 and each fuel element 70 is held down only by the flow of pressurized light water flowing through said pressurized vessel 4. Each element is aligned at its top portion by pin 78 resting in slot 80 in island wall 18. Pin 78 is toggled to comb 82 of fuel element 70, so as to point in either of two directions, downwardly when at the bottom of element 70 and inwardly when at the top of element 70, thereby allowing each fuel element 70 to be individually inverted. Each fuel plate 54 is fitted into and positioned in a longitudinally extending groove 76 in side plate 56 and a longitudinally extending groove 84a in side plate 58. Attached to side plates 56 and 58 is lifting bar 86, thereby enabling easy removal of each fuel element 70.

A second embodiment of the fuel element having the same thermal and nuclear characteristics as fuel element 70 is fuel element 90 having a plate curvature conforming to the involute of the circle describing the inner boundary, viz. inner wall 18, of annular core 42. Involute fuel element 90 consists of 16 fuel plates 92. Involute fuel element 90 is supported at the bottom by a shoulder (not shown) on the wall 22 of pressurized vessel 4 and on wall 18, and said shoulder is notched in forty plates to accept each of the twenty positioning members 94 on either end of each of fuel elements 90. To invert each of the twenty fuel elements 90 at once for the reason that each of side plates 96 and 98 would then curve in the opposite direction, there are provided alignment pins 100, shown to be eight in number, and positioning members 94 then match the second set of twenty notches on said wall 22. Each fuel plate 92 is fitted into and positioned in a longitudinally extending groove 102 in side plate 96 and a longitudinally extending groove 104 in side plate 98. Attached to side plates 96 and 98 is lifting bar 106, thereby enabling each removal of each fuel element 90. With respect to involute fuel element 90 and each of the fuel plates 92, the characteristics thereof are shown by the dimensional values of the component parts of such an element 90 as can be used, by way of a specific example, in a nuclear reactor of this invention, as follows:

$a = 0.075''$     $\theta = 78°00'$
$R_1 = 6.250''$     $x = 60°00'$
$R_2 = 9.0175''$     $y = 46°30'$
$b = 0.100''$     $z = 46°30'$
$c = 0.050''$     $g = 0.0065''$
$\alpha = 18°00'$     $h = 0.125''$
$\beta = 31°30'$     $k = 0.750''$
$d = 0.0065''$     $m = 1.250''$
$e = 0.0065''$     $n = 0.0065''$
$f = 0.125''$     $o = 0.1875''$
$\gamma = 18°00'$     $p = 13°30'$ Immediately surrounding reactor vessel 4 is liquid shim control region 26 in an approximately ¾ inch thick annulus 110 between vessel 4 and $D_2O$ reflector tank 112. Shim region 26 is composed of a ring section 114 containing ½ inch diameter tubes 116 provided for flow of borated light water. Each of sleeves 108, 118, 120 and 122 of said section 114 in region 26 are removable and replaceable with another liquid shim section or curved control blades. Borated water, or boric acid of controlled variable concentration, flows from the upper plenums through pipes 124, one for each sleeve, into headers (not shown), one for each sleeve, and back through tubes 116 and discharges to return headers (not shown) at about 175° F. A thin region 26 of borated light water is almost as effective as a thicker region of borated $D_2O$ and has the great advantage of not requiring a deuterated resin bed to adjust boron concentration nor another external $D_2O$ flow circuit. A 50% saturated boric acid solution in light water at room temperature provides 0.95 $\Delta K$ control, which is more than adequate for 500 Mwd operation. Simple on-off control, similar to that required by control blades, of boric acid concentration by injecting pure demineralized water or a saturated boric acid solution, is adequate for shim control.

The shim system includes the shim region reflector 26, heat exchanger 126, expansion tank 128, water injection pump 130, boric acid feed and mixing tank 132 and pump 134. Flow of the borated solution is from tank 132 to the inlet plenum at the top of and above the shim region reflector 26, thence in parallel flow through tubes 116, to the outlet plenum and through outlet pipes and headers (not shown) also located at the top of and above said shim region reflector 26, through heat exchanger 126 and back to tank 132. Said liquid shim region 26 is pressurized to 75 p.s.i.g. to eliminate the net production of radiolytic gas. Shim heat exchanger 126 removes 96 kw. maximum heat generated before the solution enters expansion tank 128 which assures thorough mixing of liquids or removal of excess fluid during dilution operations. Excess gases generated by radiolytic decomposition of the boric acid solution are removed from the system through tank 128. Centrifugal pump 130 forces the solution back to shim region 26 at the rate of 10 g.p.m. Heat exchanger 126 is designed for 10 atm. pressure. All parts of heat exchanger 126 outside the pool are fabricated of 316 stainless steel, the secondary water being on the shell side fabricated of carbon steel. Shim region reflector 26 worth is altered by either diluting with demineralized water and discharging excess fluid to a holdup tank (not shown) or by injecting saturated boric acid solution into expansion tank 128 while discharging the excess dilute acid to the holdup tank. The solution in the holdup tank is monitored for activity and discharged to the sewer or hot waste depending on activity level. In the shim control system are included manually operated valves 37, 65 and 39, solenoid valves 41, 43, 45, 47, 49, 51, 53, 55, 57 and 59, spring loaded check valves 61 and 63, demineralizer 67, pump 69, and $N_2$ source 71.

Immediately outside shim control region 26 is heavy water ($D_2O$) reflector 6 which is dropped for safety control, said heavy water being contained in annular 3-compartment aluminum vessel 136 having an outside diameter of 38 inches and forming a 9 inch thick safety reflector region around core 42. Tank 136 extends 6 inches above and 30 inches below core 42. The bottom 24 inches of vessel 136 is expanded to 60 inches outside diameter to form a plenum into which the heavy water is dropped. Perforated plate 138 near top of core 42 provides flow of $D_2O$ for cooling and permits the reflector to be dropped from the top portion about core 42 only. Two by-pass scram lines 140, 142 extending from the top of the drop region to the plenum are normally closed by four solenoid valves 1, 3, 7 and 9 in parallel, each of said valves 1, 3, 7 and 9 being positioned on support spider 144 above reactor core 42 and constituting scram valve assembly 146 to enable servicing in a low radiation field. Scram is initiated by opening said spring loaded solenoid valves 1, 3, 7 and 9 in said by-pass lines 140, 142, said lines 140, 142 short circuiting jet eductor 148 and connecting the gas space in the plenum with the region to be voided. The $D_2O$ drops out of the reflector region in about one second, the major resistance to reflector drop being the gas flow. The negative worth of safety reflector 6 is calculated to be at least 0.16 $\Delta K$ which is adequate to shut the reactor down under any fault condition.

In the operation of the $D_2O$ reflector water coolant flows from vessel 136 to the $D_2O$ heat exchanger 152 and back to the lower plenum. Water jet eductor 148, in line 150 from the top of reflector vessel 136 to the plenum, raises the $D_2O$ into the reflector region 6 and provides flow from the top of tank or vessel 136 to the plenum through line 150. Approximately 800 kw. of heat is generated in reflector 6 when reactor 2 is operating at 15 mw., about 15% of this heat being generated in the upper compartment of tank 136. The heavy water is cooled by withdrawing about 10 g.p.m. from the upper compartment and 60 g.p.m. from the lower compartment and passing the 170° F. combined flows into heat exchanger 152 where the temperature is reduced to 110° F. The deuterium passes, by means of pump 33 from the lower plenum of tank 136 through heater 160 to recombiner 154. The radiolytic deuterium-oxygen-nitrogen gas mixture is heated, and the deuterium is catalytically recombined in catalytic recombiner 154 into heavy water. An after cooler 156 reduces the gas temperature to 212° F. In the system for the $D_2O$ safety reflector 6 are included spring loaded check valves 11, 13 and 15, solenoid valves 17 (from the $N_2$ source), 19 (from the $O_2$ source), 21, 23, 23a and 25, manually operated valves 27 and 29, pumps 31 and 33, and demineralizer 35. As is readily apparent, tank 136 can be rapidly filled or emptied of $D_2O$, as operating conditions require. Upper support spider 144 is positioned approximately 11 feet above core 42 and is held in position and rests on support lugs 73 embedded in the wall of the main pool vessel 12, said spider 144 forming a support for said scram valves 1, 3, 7 and 9, other experiment leads, etc. Pool water 14 can be lowered to the spider level to facilitate servicing of said scram valves and other equipment.

Through said $D_2O$ reflector 6 are provided directly open to pool water 14 seven vertical experimental test holes or wells 75, 77, 79, 81, 83, 85 and 87 to accommodate test loops or capsules. When each of said holes or wells is filled with light water, the average thermal neutron flux is about $1.2 \times 10^{14}$ n./cm.$^2$-sec. An eighth vertical hole 87a through said $D_2O$ reflector is provided for a regulating rod (not shown).

Surrounding safety reflector 6 is the annular ring graphite reflector 8 which is 10½ inches thick and 48 inches high and is of impervious reactor grade graphite in eight spaced-apart sections 89, 91, 93, 95, 97, 99, 99a and 101 which are adequately cooled by natural convection of pool water 14. Said graphite reflector 8 reduces the amount of $D_2O$ required while still extending the region of relatively high neutron fluxes for potential experimental positions. Each of said graphite block sections 89–101 can be provided with holes, such as test hole 103 having a test loop 105, for experiments. Unperturbed thermal neutron fluxes up to approximately $$9 \times 10^{13} \text{ n./cm.}^2\text{-sec.}$$

are available in said graphite reflector 8.

The entire reactor assembly 2 is positioned in vessel 4 being 10 feet in diameter by 33 feet high filled with demineralized pool water 14, said vessel 4 being steel lined, said pool water 14 being approximately 24½ feet above core 42 and providing a biological shield therefor. Annular ring 16 of baryates concrete, 54 inches thick, extends upwardly 11 feet above core 42 centerline, said reflector assembly 5 and pool water 14 providing adequate thermal shielding for said ring 16. Radiation dose rates at all surfaces which can be approached by personnel are 1 mrem./hr., or less, from direct radiation.

The main experimental test hole is centrally positioned light water island 20 open to pool 14 and constituting the center flux-trap. U-tube test loop 32, constituting a central test loop, of any diameter up to an outside diameter of approximately 11 inches can be inserted in island 20, the top flanges 107, 109 being below the surface of pool 14, and the surface of pool 14 can thereby be lowered below said top flanges 107, 109, 117 to enable removal or insertion of experiments from or in said loop 32. Loop removal well 111 is provided in the bottom of pool 14 to facilitate removal of loop 32, thereby permitting removal thereof without emptying pool 14 or removing other experiments. To remove U-tube loop 32 pool 14 is lowered to the top of reactor vessel 4, each of leg 113 and of leg 115 of loop 32 is disconnected at flange 117, which is preferably less than 11½ inches, and at flange 109, U-tube 121 is lowered into well 111, U-tube 121 is rotated to clear reactor 2, and U-tube 121 is then raised out of pool 14. Also, thimble type loop 125 instead of a U-tube loop can be inserted into island 20.

Likewise, each of test holes 75, 77, 79, 81, 83, 85 and 87 is suitable to receive capsule experiments, thimble-type loop 125 and U-tube loop 32.

Graphite reflector 8 has therein test hole 127 having sleeve 131 to receive sleeve 139 to receive experiments. Each of said graphite sections 89–101 may be aluminum clad and is supported by perforated reflector grid 141 welded onto wall of 136. Integral with grid 141 is reflector retainer wall 143.

Reactor cooling system 145 is designed to remove 15 mw. thermal power from reactor 2, and pertinent data therefor is as follows:

TABLE I

*Reactor cooling system*

| | |
|---|---|
| Reactor power _____ mw__ | 15 |
| Primary loop power _____ mw__ | 13.5 |
| $D_2O$ power _____ mw__ | 0.8 |
| Pool heat _____ mw__ | 0.65 |
| Shim reflector heat _____ mw__ | 0.05 |
| Operating pressure _____ p.s.i.a__ | 75 |
| Number of primary heat exchangers _____ | 2 |
| Primary heat exchanger area, each _____ ft.$^2$__ | 3,680 |
| Core coolant temperature: | |
|    Inlet _____ °F__ | 110 |
|    Outlet _____ °F__ | 133.5 |
| Primary flow rate _____ g.p.m__ | 4,000 |
| Secondary flow rate _____ g.p.m__ | 6,400 |
| Number of primary pumps _____ | 2 |
| Primary pump motor rating, each _____ H.P__ | 75 |
| Number of secondar pumps _____ | 2 |
| Secondary pump motor rating, each _____ H.P__ | 100 |
| Secondary coolant temperature: | |
|    On tower _____ °F__ | 104 |
|    Off tower _____ °F__ | 88 |
| Design wet bulb temperature _____ °F__ | 80 |

The primary cooling system 147 is normally operated as a closed, slightly pressurized system at 15 mw. and pertinent data therefore is as follows:

TABLE II

*Primary cooling system or core heat transport data*

| | |
|---|---|
| Reactor power _____ mw__ | 15 |
| Core: | |
|    I.D. _____ in__ | 12.50 |
|    O.D. _____ in__ | 18.16 |
|    Height _____ in__ | 36 |
|    Volume _____ l__ | 80.44 |
| Heat transfer area _____ ft.$^2$__ | 544 |
| Coolant flow area _____ ft.$^2$__ | 0.542 |
| Coolant flow rate _____ g.p.m__ | 4000 |
| Core coolant velocity _____ ft./sec__ | 16.5 |
| Coolant temperature: | |
|    Inlet _____ °F__ | 110 |
|    Outlet _____ °F__ | 133.5 |
| Maximum surface temperature _____ °F__ | 240 |
| Core pressure: | |
|    Inlet _____ p.s.i.a__ | 75 |
|    Hot spot _____ p.s.i.a__ | 69 |
|    Outlet _____ p.s.i.a__ | 65 |
| Saturation temperature: | |
|    Inlet _____ °F__ | 307 |
|    Hot spot _____ °F__ | 300 |
|    Outlet _____ °F__ | 297 |
| Nominal burnout power at hot spot _____ mw__ | 100 |
| Power density: | |
|    Average _____ mw/l__ | 0.187 |
|    Maximum _____ mw/l__ | 0.518 |
| Max./ave. power distribtuion: | |
|    Radial _____ | 2.2 |
|    Axial _____ | 1.26 |
|    Over-All _____ | 2.77 |
| Hot channel factors: | |
|    Bulk coolant temperature _____ | 1.3 |
|    Coolant film temperature _____ | 1.5 |

Annular core 42 consists of 18 circumferential curved plate fuel assembly 70 or 20 involute curved plate fuel assembly 90. The maximum-to-average power ratios in the axial and radial directions (with poisoned shim) are 1.26 and 2.2, respectively. Hot channel factors of 1.3 for the bulk coolant temperatures, and 1.5 for the film temperatures are used. At the specified flow rate of 4000 g.p.m. slightly pressurized reactor 2 can be operated at 15 mw. to provide the desired thermal neutron flux. Maximum surface temperature at the "hot spot" is 240° F. and saturation temperature is 300° F. The nominal margin to heat-transfer burn-out is about a factor of seven in reactor power. Reactor 2 also is capable of operating open to pool 14 at powers up to 12 mw. Reactor power can be increased to at least 20 mw. with added secondary cooling tower capacity. With graded fuel and additional secondary cooling tower capacity, reactor power can be increased to at least 30 mw. Coolant flows at a velocity of 16.5 ft./sec. in the channels through core 42, and the pressure drop across core 42 is 11 p.s.i. The pressure drop from core 42 to the primary pumps 151, 153 is about 5 p.s.i., and the pressure at the primary pump suction is 40 p.s.i.a. for closed loop operation. Primary heat exchangers 155, 157, each having 2000 g.p.m. heat exchange capacity, is a tube and shell exchanger using one shell pass and two tube passes. The primary, demineralized coolant flows inside the tubes and all surfaces in contact with the primary coolant are of 304 LC stainless steel. The shell side material, in contact with the secondary coolant, is carbon steel. Data for each heat exchanger 155, 157 is as follows:

TABLE III

*Primary heat exchanger data*

| | |
|---|---|
| Number _____ | 2 |
| Shell, I.D. _____ in__ | 42 |
| Tube size: | |
|    O.D. _____ in__ | ¾ |
|    BWG gauge _____ | 16 |
|    Length _____ ft__ | 16 |
| Tube pitch, square _____ in__ | 1 |
| Number of tubes per unit _____ | 1171 |
| Surface area per unit _____ ft.$^2$__ | 3680 |
| Pressure drop: | |
|    Primary _____ p.s.i__ | 4 |
|    Secondary _____ p.s.i__ | 20 |
| Coolant flow rate: | |
|    Primary _____ g.p.m__ | 4000 |
|    Secondary _____ g.p.m__ | 6400 |
| Tube side temperature: | |
|    Inlet _____ °F__ | 133.5 |
|    Outlet _____ °F__ | 110 |
| Shell side temperature: | |
|    Inlet _____ °F__ | 88 |
|    Outlet _____ °F__ | 104 |

Shut down emergency pump 159, rated at 300 g.p.m., is provided. The pump impellers of pumps 151, 153 and 159 are of 304 stainless steel, and the casings of pumps 151, 153 and 159 are of cast iron. Loop pressure is maintained by compressed air or nitrogen admitted to standpipe 161 pressurized at 75 p.s.i.a. by pressure regulating valves 163, 165, and a constant gas discharge to the stack (not shown) is maintained to sweep off radiolytic gases. Liquid level is controlled between high and low level limits.

For water cleanup, a flow of 50 g.p.m. is provided to maintain primary coolant purity to about 1 p.p.m. solids. Mixed bed demineralizer units 167, 173, 10 micron filters 169, 171 and conductivity cells, not shown, are provided for reactor 2. During open primary loop operation, all demineralizer flow is sent directly to pool 14, thereby insuring flow from pool 14 into the open primary system and maintaining pool surface activity low. During closed loop operation primary demineralizer 167 flow is directed back to the inlet side of each of primary pumps 151, 153; the respective flows to demineralizers 167, 173 are shut off during regeneration or replacement of resin.

All primary loop piping outside of pool 14 is 304 LC stainless steel. Outlet pipe 175 from core 442 to pumps 151, 153 is 14-inch schedule 40 pipe, and inlet pipe 177 to core 42 is 12-inch schedule 40 pipe. Flow orifices (not shown) are provided in the primary coolant and shutdown system pipes.

Pump 159 provides shutdown and emergency cooling in the primary loop, and failure free power is provided for pump 179, the heat being rejected through one of primary heat exchangers 155 and 157 to the secondary coolant system, and for secondary shutdown coolant pump 179, rated at 400 g.p.m.

Heat is produced in pool 14 by heat generation in graphite reflector 8 and by heat transfer from the primary loop and $D_2O$ systems, including reflector 6 and borated water shim region 26. Approximately 0.65 mw. of heat must be rejected, and a major portion of this heat is from the hot primary loop.

Pool cooling system with a flow rate of 500 g.p.m. is provided for cooling pool 14 and includes 500 g.p.m. pump 181, heat exchanger 183 rated at 500 g.p.m., 50 g.p.m. demineralizer 173, filters 185, 187, manually operated stop valves 189, 191, 193, 195, 197, 199, 201 and 203, and instrumentation therefor (not shown). Pool coolant temperature is maintained below 105° F. on the hottest days and normally at about 95° F. All surfaces in contact with pool water, outside of pool vessel 12, are 304 stainless steel.

Pumps 205, 207, each rated at 3200 g.p.m., provide secondary coolant flows, and emergency pump 179, rated at 400 g.p.m., provides shutdown and emergency cooling. Total heat rejection of secondary cooling system, which includes pumps 179, 205, 207, make up 5000-gallon water tank 209, cooling tower 211, screen and filter 213, manually operated stop valves 215, 217, 219, 221, 223, 225, 227, and flapper valve 229, is 15 mw. for reactor 2. Off tower temperature is 88° F. for maximum wet bulb temperature of 80° F. and an on-tower temperature of 104° F. Approximately 220–250 g.p.m. of relatively pure treated makeup water is required for cooling tower 211 makeup.

In the primary coolant system are also included manually operated stop valves 231, 233, 235, 237, 239, 241, 243, 245, 247, 249, 251, 253 and 255, and dual manually operated stop valve 257.

Reactor data for 15 mw. operation is summarized in Table IV, as follows:

TABLE IV

*Reactor data summary*

1. General characteristics:
    Reactor power—15 mw.
    Center test hole coolant—Pool water.
    Inside diameter center test loop—19 cm., 7 in.
    Material in center test loop—Sodium.
    Number of reflector test holes—7.
    Inside diameter reflector test holes—7.6 cm., 3 in.
    Material in reflector test holes—Pool water.
    Neutron fluxes—
        Average in center test loop:
            Thermal—$1.0 \times 10^{14}$ n./cm.$^2$-sec.
            Epithermal—$1.4 \times 10^{14}$ n./cm.$^2$-sec.
        Thermal peak in center test loop—$1.2 \times 10^{14}$ n./cm.$^2$-sec.
        Average in core:
            Thermal—$0.26 \times 10^{14}$ n./cm.$^2$-sec.
            Epithermal—$1.76 \times 10^{14}$ n./cm.$^2$-sec.
        Average in reflector experimental holes—
            Thermal:
                Clean shim—$1.24 \times 10^{14}$ n./cm.$^2$-sec.
                Poisoned shim—$1.10 \times 10^{14}$ n./cm.$^2$-sec.
            Epithermal—$0.7 \times 10^{14}$ n./cm.$^2$-sec.
    Fuel mass:
        Cold, clean, critical loading—7.0 kg. $U^{235}$.
        Initial new core loading—11.0 kg. $U^{235}$.
        Hot, poisoned depleted critical loading—10.0 kg. $U^{235}$.
        Core life per loading cycle—500 mw.
        Burnup per cycle—5.9%.
        Discharge fuel burnup after 6 cycles—35.4%.

TABLE IV—Continued

Excess reactivity requirements:
    Burnup per cycle and low gross section fission products (500 Mwd) _____ 2.10% ΔK
    Equilibrium xenon and samarium _____ 4.84% ΔK
    Xenon override (1 hour) _____ .45% ΔK
    Temperature _____ 0.25% ΔK
    Experiments and core loading mismatch _____ 1.00% ΔK
    _____
    8.73% ΔK Prompt neutron lifetime:
    Hot depleted core—$1.5 \times 10^{-4}$ sec.

2. Reactor data—
    Core:
        Height—91.44 cm., 36 in.
        Outside diameter—47.0 cm., 18.5 in.
        Active thickness—7.2 cm., 2.83 in.
        Volume—80.4 liters.
        Metal-to-water ratio—0.685.
        Coolant—$H_2O$.
        Design power:
            Average—0.187 mw./liter.
            Maximum—0.518 mw./liter.
    Experimental test facilities—
        Center loop:
            Inside diameter—17.8 cm., 7 in.
        Reflector test holes:
            Number—7.
            Inside diameter—7.6 cm., 3 in.
    Fuel assembly
        Plate thickness—0.127 cm., 0.050 in.
        Aluminum clad thickness, min.—0.033 cm., 0.013 in.
        Coolant gap—0.185 cm., 0.073 in.
        Fuel plates per assembly:
            Circumferential type—25.
            Involute type—16.
        $U^{235}$ per fuel assembly:
            20 assemblies per core—550 gms.
            18 assemblies per core—610 gms.
        Fuel alloy, uranium (90% enriched)—29 wt. percent U in Al.
    Reflector—
        Thickness:
            Inner $D_2O$—23 cm., 9 in.
            Outer graphite—27 cm., 10.5 in.
        Height—122 cm., 48 in.
    Control—
        Safety reflector:
            Thickness—23 cm., 9 in.
            Total reactivity worth—~16% ΔK/K.
        Shim reflector:
            Equivalent thickness—0.7 cm., 0.275 in.
                Material—$H_3BO_3$ in $H_2O$.
                Boron concentration—0.025 gms./cc.
                Reactivity worth—9.5% ΔK/K.

3. Reactor cooling system:
    Reactor power level (each)—15 mw.
    Primary and secondary coolant—$H_2O$.
    Core cooling:
        Coolant flow rate—$1.51 \times 10^4$ 1/min., 4000 g.p.m.
        Pressure at core inlet, absolute—5.3 kg./cm.$^2$, 75 p.s.i.a.
        Pressure at core outlet, absolute—4.6 kg./cm.$^2$, 65 p.s.i.a.
        Saturation temperature, core outlet—147° C., 297° F.

TABLE IV—Continued

Coolant temperature:
    Core inlet—43.5° C., 110° F.
    Core outlet—56.5° C., 113.5° F.
Maximum fuel plate:
    Surface temperature—115° C., 240° F.
    Saturation temperature at hot spot—149° C., 300° F.
    Heat transfer area—50.5 m.$^2$, 544 ft.$^2$.
    Coolant flow area—0.05 m.$^2$, 0.542 ft.$^2$.
    Coolant velocity—5 m./sec., 16.5 ft./sec.
    Heat flux:
        Average — 27 watts/cm.$^2$, $8.5 \times 10^4$ B.t.u./hr.-ft.$^2$.
        Maximum—74 watts/cm.$^2$, $2.35 \times 10^5$ B.t.u./hr.-ft.$^2$.
    Power density:
        Average—169 kw./liter.
        Maximum—470 kw. liter.
Primary cooling system:
    Flow rate—$1.51 \times 10^4$ 1/min., 400 g.p.m.
    Heat exchangers:
        Number—2.
        Heat transfer area (each)—340 m.$^2$, 3680 ft.$^2$.
    Primary coolant pumps:
        Number—2.
        Head—21.5 m., 70 ft.
        Motor power (each)—55 kw., 75 H.P.
    Emergency and shutdown pump:
        Head—3 m., 10 ft.
        Flow rate—1130 1/min., 300 g.p.m.
        Motor power—0.75 kw., 1 H.P.
Secondary cooling system:
    Design heat load—15 mw.
    Flow rate—$2.4 \times 10^4$ 1/min., 6400 g.p.m.
    Coolant temperature:
        On tower—40° C., 104° F.
        Off tower—31° C., 88° F.
    Design wet bulb:
        Temperature—26° C., 80° F.
        Cooling towers, number—1.
    Secondary coolant pumps:
        Number—2.
        Head of water—30 m., 100 ft.
        Motor power, each—75 kw., 100 H.P.
    Emergency and shutdown pump:
        Head of water—3, 10 ft.
        Flow rate—1500 1/min., 400 g.p.m.
        Motor power—1 kw., 1.35 H.P.
4. Shielding:
    Source power—15 mw.
    Source flux—$6.3 \times 10^{18}$ mev/sec.
    Radial shield:
        $D_2O$—23 cm., 9 in.
        Graphite—27 cm., 10.5 in.
        $H_2O$—100 cm., 40 in.
        Barytes concrete:
            (S.G.=3.4)—137 cm., 54 in.
        Dose rate at outer surface—1 mrem./hr.
    Vertical shield:
        $H_2O$—7.4 m., 24.5 ft.
        Dose rate (direct)—1 mrem./hr.

A second embodiment of the flux-trap reactor of this invention is reactor 298 in which beryllium reflector 300 is provided to replace $D_2O$ reflector portion 6 of reactor 2 and in which thin liquid shim control means 302 is retained, but in which safety control means 304 is used, said safety control means including four wide blades, or rods, 306, 308, 310, 312. Beryllium reflected reactor 298 is essentially identical to reactor 2 except that $D_2O$ reflector 6 is replaced by beryllium reflector 300 including beryllium sections 314, 316, 318, 320, 322, 324, 326, 328, each section being aluminum clad, the width of reflector 300 being 6 inches. Graphite portion 8, following reflector 300, is 10½ inches thick and each section thereof is aluminum clad. Said safety control blades 306, 308, 310, 312 are movably positioned in ½ inch slots 330, 332, 334, 336, each being next to liquid control means, or region, 302. Drive means 338 for said control means 304 is positioned on the upper support spider 340 having suitable submersible housing. The blades 306, 308, 310, 312 almost completely surround reactor vessel 4 to maximize rod or blade worth. The blades are worth at least 0.16 ΔK which is adequate to shut down the reactor under any fault condition. Also connected to said blades is mechanical means 342 operatively slidable on support means 344. Thimble test loop 346, having inlet 360 and outlet 362, is positioned in island 20, and core coolant inlet nozzle 348 together with core coolant outlet nozzle 350 are utilized. Also coolant outlet nozzle 352 for pool 14 is utilized. Support strut means 354 supports pressurized annular vessel 4 wherein is positioned core 42. Perforated annular plate 356 welded to inner wall 18 and outer wall 22 supports core 42.

The coolant system is sized to remove 15 mw. reactor heat, and the maximum-to-average power ratios in the core are 1.26 axially and 1.8 radially. Uniformly loaded core 42 is capable of operating at about 25 mw. only with added cooling tower capacity. Pool cooling flow is increased to 800 g.p.m. from 500 g.p.m. to cool beryllium reflector 300, and the total heat removed by the pool coolant system is about 1.4 mw. Reflector 300 is cooled by forced convection of pool water downward, through reflector 300, and into a flow plenum 358. Coolant temperature rise is about 12° F., and an 800 g.p.m. pump (not shown) together with 10 H.P. prime mover means (not shown) therefor are provided.

Fuel loading for an excess reactivity of 9% is a little less than 11 kg. The reactivity requirements for reactor 298 are substantially identical with those for reactor 2, and core 42 will operate for 500 Mwd. With zone loading, the discharged fuel will attain a greater than 30% fuel burnup. The average thermal neutron flux in a sodium filled test loop 346, sodium being used only as a typical absorbing material, is about $1.05 \times 10^{14}$ n./cm.$^2$-sec. and in a test hole, such as test hole 358, in reflector 300, is about $1.0 \times 10^{14}$ n./cm.$^2$-sec. Peak neutron fluxes are about 15–20% greater than in reactor 2. The reactivity coefficients in central island 20 and core 42 are substantially identical to those for reactor 2. The temperature and void coefficients in the reflector 300 are variable, being affected by the amount of shim poison and the number of experimental holes. Liquid shim control means 302 provides shim control, and 0.25 gm./cc. boric acid solution in shim region 302 is worth approximately 0.09 ΔK. Safety blades 306, 308, 310, 312 also provide shim control as well as safety control.

While the specific fuel described is U-Al alloy, other fuel materials may be used. For example, uranium enriched to 90% $U^{235}$, $Pu^{239}$, $U^{233}$ and mixtures of fissionable materials, such as $U^{235}$, and $Pu^{239}$, may be used as the fissionable component of the reactor fuel material. The critical masses of fissionable material may be determined for particular reactor active portion configuration according to methods disclosed in the prior art.

Other variations in the reactor can also be employed. For example, the use of known solid reflector materials such as beryllium, beryllium oxide, graphite or combinations thereof with safety control being provided by moving the control rods in suitable places, such as in a thin annulus just inside or outside the shim control region. Safety rods can also, if desired, be inserted in the center flux trap region. Alternatively, instead of employing control rods, parts of the solid reflector region can be moved for safety control. In addition, other suitable fluids, both gas or liquids, including solutions, can be substituted for borated water in the shim control.

Many alterations and changes may be made without departing from the spirit and scope of this invention which is set forth in the appended claims which are to be construed as broadly as possible in view of the prior art.

This application is copending with application Ser. No. 195,128, of William R. Pearce, Oscar J. Elgert and Byron H. Leonard, Jr., filed on May 16, 1962, and said copending application and this application have a common assignee.

We claim:

1. A nuclear reactor comprising, in combination, a main vessel, an annular pressurized vessel positioned in said main vessel, a core containing material fissionable by neutrons of thermal energy, said core being positioned within said annular pressurized vessel, a reflector assembly positioned in said main vessel, said reflector assembly being positioned about said pressurized vessel, said reflector assembly including at least one of a droppable fluid reflector material and a solid reflector material, means for controlling said reactor, said reactor control means including at least a fluid control material, said reactor control means being between said pressurized annular vessel and said reflector assembly, means for passing coolant through said main vessel, and means for passing pressurized coolant through said annular pressurized vessel, whereby said controls and said reflector assembly are non-pressurized and said core is pressurized.

2. The nuclear reactor of claim 1 wherein said fluid control material of said reactor control means is substantially adjacent to said core.

3. The nuclear reactor of claim 1 wherein said fluid control material of said reactor control comprises borated water.

4. The nuclear reactor of claim 1 wherein said fluid control material of said reactor control means constitutes a relatively thin region.

5. The nuclear reactor of claim 1 wherein said fluid control material of said reactor control means is substantially adjacent to said core and constitutes a relatively thin region.

6. The nuclear reactor of claim 1 wherein said fluid control material of said reactor control means comprises a relatively thin region of borated water substantially adjacent to said core.

7. A nuclear reactor comprising, in combination, a main vessel, an annular pressurized vessel positioned in said main vessel, a core containing material fissionable by neutrons of thermal energy, said core being positioned within said annular pressurized vessel, a light water island, said core being positioned about said light water island, said light water island opening into said main vessel, a reflector assembly positioned in said main vessel, said reflector assembly being positioned about said pressurized vessel, said reflector assembly including at least one of a droppable fluid reflector material and a solid reflector material, means for controlling said reactor, said reactor control means including at least a fluid control material, said reactor control means being between said pressurized annular vessel and said reflector assembly, means for passing coolant through said main vessel, and means for passing pressurized coolant through said annular pressurized vessel, whereby said controls and said reflector assembly and said tight water island are non-pressurized and said core is pressurized.

8. A nuclear reactor comprising, in combination, a main vessel containing light water, said light water forming a pool in said main vessel, an annular pressurized vessel submerged in said light water forming said pool, a core containing material fissionable by neutrons of thermal energy, said core being positioned within said annular pressurized vessel, a reflector assembly positioned submerged in said light water forming said pool, said reflector assembly being positioned about said pressurized vessel, said reflector assembly including at least one of a droppable fluid reflector material and a solid reflector material, means for controlling said reactor, said reactor control means being submerged in said light water forming said pool and including at least a fluid control material, said reactor control means being between said pressurized annular and said reflector assembly, means for passing light water coolant through said main vessel, and means for passing light water coolant pressurized to a pressure above the hydrostatic pressure of said pool through said annular pressurized vessel, whereby said controls, said reflector assembly and said pool are non-pressurized and said core is pressurized.

9. A nuclear reactor comprising, in combination, a main vessel containing light water, said light water forming a pool in said main vessel, an annular pressurized vessel submerged in said light water forming said pool, a core containing material fissionable by neutrons of thermal energy, said core being positioned within said annular pressurized vessel, a light water island, said core being positioned about said light water island, said light water island opening into said light water forming said pool in said main vessel, a reflector assembly submerged in said light water forming said pool, said reflector assembly being positioned about said pressurized vessel, said reflector assembly including at least one of a droppable fluid reflector material and a solid reflector material, means for controlling said reactor, said reactor control means being submerged in said light water forming said pool and including at least a fluid control material, said reactor control means being between said pressurized annular vessel and said reflector assembly, means for passing light water coolant through said main vessel, and means for passing light water coolant pressurized to a pressure above the hydrostatic pressure of said pool through said annular pressurized vessel, whereby said controls, said reflector assembly, said light water island and said pool are non-pressurized and said core is pressurized.

10. A nuclear reactor comprising, in combination, a main vessel, an annular pressurized vessel positioned in said main vessel, a core containing material fissionable by neutrons of thermal energy, said core being positioned with said annular pressurized vessel, a reflector assembly positioned in said main vessel, said reflector assembly being positioned about said pressurized vessel, said reflector assembly including at least one of a droppable fluid reflector material and a solid reflector material, means for controlling said reactor, said reactor control means including at least a fluid control material, said reactor control means being between said pressurized annular vessel and said reflector assembly, means for passing coolant through said main vessel, and closed loop means for passing pressurized coolant through said annular pressurized vessel, whereby said controls and said reflector assembly are non-pressurized and said core is pressurized.

11. A nuclear reactor comprising, in combination, a main vessel, an annular pressurized vessel positioned in said main vessel, a core containing material fissionable by neutrons of thermal energy, said core being positioned within said annular pressurized vessel, a light water island, said core being positioned about said light water island, said light water island opening into said main vessel, a reflector assembly positioned in said main vessel, said reflector assembly being positioned about said pressurized vessel, said reflector assembly including at least one of a droppable fluid reflector material and a solid reflector material, means for controlling said reactor, said reactor control means including at least a fluid control material, said reactor control means being between said pressurized annular vessel and said reflector assembly, means for passing coolant through said main vessel, and closed loop means for passing pressurized coolant through said annular pressurized vessel, whereby said controls and said reflector assembly and said light water island are non-pressurized and said core is pressurized.

12. A nuclear reactor comprising, in combination, a main vessel containing light water, said light water forming a pool in said main vessel, an annular pressurized vessel submerged in said light water forming said pool, a core containing material fissionable by neutrons of thermal energy, said core being positioned within said annular pressurized vessel, a reflector assembly positioned submerged in said light water forming said pool, said reflector assembly being positioned about said pressurized vessel, said reflector assembly including at least one of a droppable fluid reflector material and a solid reflector material, means for controlling said reactor, said reactor control means being submerged in said light water forming said pool and including at least a fluid control material, said reactor control means being between said pressurized annular vessel and said reflector assembly, means for passing light water coolant through said main vessel, and closed loop means for passing light water coolant pressurized to a pressure above the hydrostatic pressure of said pool through said annular pressurized vessel, whereby said controls, said reflector assembly and said pool are non-pressurized and said core is pressurized.

13. A nuclear reactor comprising, in combination, a main vessel containing light water, said light water forming a pool in said main vessel, an annular pressurized vessel submerged in said light water forming said pool, a core containing material fissionable by neutrons of thermal energy, said core being positioned within said annular pressurized vessel, a light water island, said core being positioned about said light water island, said light water island opening into said light water forming said pool in said main vessel, a reflector assembly submerged in said light water forming said pool, said reflector assembly being positioned about said pressurized vessel, said reflector assembly including at least one of a droppable fluid reflector material and a solid reflector material, means for controlling said reactor, said reactor control means being submerged in said light water forming said pool and including at least a fluid control material, said reactor control means being between said pressurized annular vessel and said reflector assembly, means for passing light water coolant through said main vessel, and closed loop means for passing light water coolant pressurized to a pressure above the hydrostatic pressure of said pool through said annular pressurized vessel, whereby said controls, said reflector assembly, said light water island and said pool are non-pressurized and said core is pressurized.

References Cited by the Examiner
UNITED STATES PATENTS

| | | | |
|---|---|---|---|
| 2,857,324 | 10/1958 | De Boisblanc et al. | 176—17 |
| 2,999,059 | 9/1961 | Treshow | 176—20 |
| 3,149,044 | 9/1964 | De Boisblanc et al. | 176—18 |

LEON D. ROSDOL, *Primary Examiner.*

REUBEN EPSTEIN, CARL D. QUARFORTH,
*Examiners.*

J. V. MAY, *Assistant Examiner.*